United States Patent Office 3,291,632
Patented Dec. 13, 1966

3,291,632
METHOD OF PREPARING A MEMBRANE OF DIVINYL BENZENE, STYRENE AND MALEIC ANHYDRIDE
Donald R. Nielsen, Corpus Christi, Tex., assignor to Pittsburgh Plate Glass Company, Pittsburgh, Pa., a corporation of Pennsylvania
No Drawing. Filed Sept. 16, 1963, Ser. No. 309,308
3 Claims. (Cl. 117—54)

This application is a continuation-in-part of my copending application Serial No. 29,559 filed May 17, 1960, now abandoned.

The present invention relates to the electrolytic production of chlorine and alkali metal hydroxide. More particularly, the present invention relates to the preparation of improved diaphragms or membranes for electrolytic cells utilized to produce chlorine and alkali metal hydroxides by electrolysis of alkali metal chloride solutions.

It has been proposed in the co-pending application of William W. Carlin, U.S. Serial No. 847,591, filed October 20, 1959, now abandoned, that alkali metal hydroxide and chlorine be produced from alkali metal chloride solutions by electrolysis in cells having specialized membranes. In the cells disclosed in the above-mentioned application, a saturated brine solution is fed to the anode containing section of a compartmental cell. Water or alkali metal hydroxide is fed to the cathode containing compartment of the cell. The catholyte chamber or cathode containing compartment and the anolyte chamber or anode containing compartment are separated from each other by an asbestos diaphragm impregnated with a polymer of an ethylenically unsaturated compound. The polymers contemplated usually have free acid groups or acid forming groups thereon. When the cell employing this polymer containing asbestos diaphragm is utilized to electrolyze an alkali chloride solution, sodium ion migration from the anolyte to the catholyte compartment takes place resulting in the production of a highly concentrated alkali hydroxide solution in the catholyte compartment and the evolution of gaseous chlorine in the anolyte compartment. Alkali metal hydroxide so formed in the catholyte compartment contains little or no alkali metal chloride contaminants. The production of a highly concentrated alkali metal hydroxide containing little or no alkali metal chloride contamination is most desirable since it substantially reduces the processing steps normally required to remove chloride contaminants contained in electrolytically produced alkali metal hydroxide.

It has been found in operating cells employing membranes of the type described above that certain conditions detract from their desirability. Thus, cells of this character will often exhibit low alkali-hydroxide efficiency or low chlorine efficiency when operated with diaphragms having low polymer loadings. This means that the cell produces chlorine and alkali metal hydroxides in quantities considerably below those that should be obtained per unit of electricity applying Faraday's law to the electrolysis of brine. To maintain cell operation at adequate efficiency values, it has been found that efficiency is increased as polymer loading on the asbestos matrix is increased. Single polymerizations carried out in the presence of an inert organic solvent to achieve high polymer loading have not been successful in achieving this result. Thus, several polymerizations conducted in the presence of an inert organic solvent are normally conducted in sequence to provide membranes having sufficient polymer thereon to produce high alkali metal hydroxide efficiency, e.g., 70 to 80 percent. While sequential polymerizations have resulted in the production of adequate membranes having high polymer loading, the procedures are costly and time consuming and for these reasons not entirely satisfactory.

It has been found, according to the present invention, that by recourse to allowing polymerization of ethylenically unsaturated polymers to take place on an asbestos diaphragm in the substantial absence of a solvent it is now possible to achieve consistently high alkali metal hydroxide efficiencies in the operation of electrolytic cells employing membranes of this character for the production of alkali metal hydroxide from an alkali metal chloride solution. The process is extremely rapid and effective in producing superior membranes and not only are high alkali metal hydroxide efficiencies achieved (80 to 95 percent) but low salt content alkali metal hydroxide is produced in cells employing these membranes. The asbestos treated by the polymerization procedures of the instant invention contains high polymer loading after a single treatment and the polymer loading is usually equivalent to or greater than that achieved when three or four sequential polymerizations are employed.

Thus, in order to prepare a membrane containing a high polymer loading in a single operation, a solution of an unsaturated organic compound containing free acid or anhydride groups and having low solubility in organic liquids such as divinylbenzene is prepared by dissolving such compound, for example, maleic anhydride in a suitable solvent such as dioxane. The asbestos to be treated is conveniently immersed in the dioxane solution containing the maleic anhydride and, after saturation of the asbestos paper, the dioxane is evaporated therefrom. Upon completion of the evaporation of the solvent from the maleic anhydride, the maleic anhydride impregnated asbestos sheet is then impregnated with an ethylenically unsaturated compound such as divinylbenzene. The moist asbestos is then heated between two pieces of glass for a considerable period of time and weighed. Unsaturated acids or anhydrides which are soluble in the ethylenically unsaturated compound can be dissolved in the latter and added as a homogeneous solution.

It is found that by conducting the copolymerization of the maleic anhydride and other like compounds impregnated on an asbestos sheet with the divinylbenzene or other like material, in the substantial absence of a solvent that unexpectedly high polymer loadings are readily achieved over those experienced with polymerizations conducted in the presence of a solvent. High caustic efficiency is experienced when a membrane prepared in this manner is utilized in an electrolytic cell producing alkali and chlorine from brine solutions. In addition, the alkali metal chloride concentration in the alkali hydroxide produced in a cell employing a diaphragm of this character is extremely low, generally below 0.1 percent on an anhydrous basis.

The preparation of the improved diaphragms of the instant invention involves copolymerizing ethylenically unsaturated compounds in the substantial absence of an inert solvent with an acid forming, olefinic, polymerizable monomer such as maleic anhydride, acrylic esters (methylacrylate or the corresponding ethyl, propyl or like esters), methylmethacrylate or homologous methacrylic esters, anhydrides and acid chlorides of acrylic acid styrene parasulfonic acids or salts or esters thereof, and other like monomers preferably having free carboxyl or sulfonic acid groups present therein in the acid, salt or anhydride form on an asbestos backing. The materials in this group which possess low solubility in the ethylenically unsaturated compounds are, prior to their incorporation on the asbestos sheets or backing utilized in accordance with this invention, dissolved in a suitable solvent such as dioxane and other ethers, chlorinated hydrocarbons such as ethylene chloride, or ketones such as acetone. The solvent will be satisfactory so long as it permits the formation of solutions containing the desired concentration of the monomer containing the free acid group or acid forming group and can be readily evaporated from the asbestos sheet once the sheet is saturated with the monomer solution.

Suitable ethylenically unsaturated polymerizable compounds which may be employed or incorporated into the asbestos are polyvinyl aromatic compounds such as commercial divinylbenzene (normally containing 20 to 60 mole percent ethyl vinyl benzene), divinyl toluenes, divinylnaphthalenes, divinyl phenyl vinyl ethers, divinyl diphenyls, substituted alkyl derivatives thereof, such as dimethyl divinyl benzenes and similar polymerizable aromatic compounds which are polyfunctional with respect to vinyl groups, or diallyl phthalate (or like diallyl esters), ethylene glycol dimethacrylate, liquid polybutadiene, or like materials which contain at least two polymerizable —C=C— groups and which polymerize to form a polymer which is insoluble in organic solvents such as acetone.

Copolymers of polyvinyl aromatic compounds and the acid forming monomers and monovinyl aromatic compounds may also be utilized to impregnate the asbestos. Typical of monovinyl aromatic compounds utilized in copolymerizations of this type are vinyl toluenes, vinyl naphthalenes, vinyl ethyl benzene, vinyl chlorobenzenes, vinyl xylenes, alpha substituted alkyl derivatives thereof such as alpha methyl vinyl benzene and other like polymerizable materials.

In addition, other resin materials containing free acid or acid forming groups may be utilized to impregnate asbestos and give rise to diaphragms having enhanced properties. Thus, materials such as phenol-formaldehyde resin, phenol-sulfonic acid-formaldehyde resins, copolymerized styrene maleic anhydride and linseed oil and other like materials may be employed. Preferably materials which are highly cross-linked and which are insoluble in caustic solutions are employed. The important consideration in the copolymerization of the compounds is the absence of solvent during the copolymerization step.

A particularly suitable diaphragm has been found in a crocidolite asbestos paper having a copolymer of maleic anhydride, divinylbenzene and styrene thereon. Membranes or diaphragms formed from these materials in the manner described herein have been found in the production of alkali metal hydroxide solutions by electrolysis in a cell employing them to provide alkali metal hydroxide solutions having extremely low alkali metal chloride contamination.

In conducting the copolymerization of an ethylenically unsaturated polymeric material with an unsaturated carboxylic acid or sulfonic acid containing asbestos sheet, recourse may be had to the suitable catalyst, such as benzoyl peroxide, 2 azo-bis (isobutyronitrile), boron trifluoride and peroxydicarbonates such as isopropyl peroxydicarbonate.

It is found in conducting the method of the present invention that adequate membranes may be readily formed by proportioning the molar ratio of the acid group containing organic compound to the vinyl unsaturated compound. Thus, it is found that adequate membranes are prepared when the molar ratios of the acid group containing organic compound to the vinyl unsaturation of the ethylenically unsaturated compound are in the range of from 0.5 mole of the acid group containing compound for each mole of vinyl unsaturation in the ethylenically unsaturated compound to 3 moles of the acid group containing compound for each mole of vinyl unsaturation. Generally, equimolar proportions of the acid group containing organic compound and the vinyl unsaturation of the ethylenically unsaturated compound are found to be best suited as membranes for the electrolytic production of alkali metal hydroxide in an alkali-chlorine electrolytic cell.

The polymer loading on the asbestos diaphragm prepared as set forth herein, generally is in the range of 50 to 200 percent polymer by weight based on dry asbestos. Preferably, the polymer is in a range of 82 to 122 percent by weight. Dry asbestos is asbestos dried at 100° C. to a constant weight.

The term "asbestos" used in the specification and claims refers to amphibole and serpentine mineral varieties and includes chrysotile, crocidolite, anthophyllite, amosite and like minerals. The preferred asbestos materials utilized to form the improved diaphragms herein described are the chrysotile and crocidolite varieties.

For a more complete understanding of the present invention, reference is made to the following examples which illustrate methods which may be conveniently employed in conducting the polymerization in accordance with the teachings of this invention:

EXAMPLE I

Two pieces of 7⅝ x 11 x 0.045 inches North American Type 41 Crocidolite Asbestos Paper were saturated with a 67 percent solution of maleic anhydride in dioxane. Another piece of the same size and type asbestos was saturated with a 47 percent solution of maleic anhydride in dioxane. Upon completion of the saturation of the asbestos paper with the maleic anhydride containing dioxane solution, the solvent was evaporated from the asbestos sheets in an oven at a temperature of 55° C. To each of the membranes removed from the oven upon completion of the drying was added the following solution:

68.2 grams of 53.5 percent divinylbenzene,
12.3 grams of styrene, and
2.77 grams of isopropyl peroxy dicarbonate.

Each membrane was polymerized between two pieces of sheet glass for 16 hours at a temperature of 55° C. A fourth membrane was prepared from a fourth piece of asbestos in a manner similar to the first three except that a 67 percent by weight solution of maleic anhydride in dioxane was employed. After the solvent was evaporated from the asbestos matrix, a solution of 68.2 grams of divinylbenzene, 12.3 grams of styrene and 13.85 grams of isopropyl peroxy dicarbonate was added thereto. This membrane was placed between two pieces of sheet glass and polymerized for 16 hours at a temperature of 55° C. The membranes prepared in the above manner were then placed in an alkali-chlorine cell containing an anode and a cathode. The cell was separated in two compartments, one containing the anode and one containing the cathode and were separated by the asbestos diaphragm which was affixed to the cathode contained in the catholyte compartment. The membrane was in contact with the anolyte. The cell was operated at voltages of from 4.1 volts to 5.1 volts. The cell was operated with the various membranes for periods up to 34 days and the results are listed below in Table I.

Table I
EVALUATION OF IPP CATALYZED MALEIC ANHYDRIDE-DIVINYL-BENZENE MEMBRANES ON CROCIDOLITE ASBESTOS PAPER

| Continuous Cell Run No. | Molar Ratio Maleic Anhydride: Vinyl Unsat. | Mole Percent Catalyst | G. polymer per sq. in. | Test Period, Days | Percent NaOH Eff. at 140 g.p.l. | Average NaCl in Caustic, Percent AB | Average Cell Voltage |
|---|---|---|---|---|---|---|---|
| 131 | 2:1 | 0.5 | 0.438 | 21 | 77 | 0.02 | 4.1 |
| 133 | 2:1 | 2.6 | 0.475 | 18 | 80 | 0.02 | 4.1 |
| 140 | 1.33:1 | 0.6 | 0.591 | 21 | 84 | 1.20 | 5.1 |
| 141 | 0.85:1 | 0.8 | 0.542 | 34 | 95 | 0.92 | 4.9 |

In the above table G. signifies grams, AB signifies anhydrous basis and g.p.l. signifies grams per liter.

As can be readily seen from the table above, an extremely efficient production of sodium hydroxide was obtained during the electrolysis with extremely low concentrations of sodium chloride in the caustic product produced.

EXAMPLE II

A membrane was prepared by adding a dioxane solution containing maleic anhydride, divinyl benzene, ethyl vinyl benzene, styrene and dichlorobenzoyl peroxide to a 7 and 5/8 inch by 11 by .047 inch piece of North American Type 41 Crocidolite Asbestos Paper. The molar ratio of maleic anhydride to the vinyl unsaturation present was 3 to 1. The dioxane solution added to the paper was heated at 55° C. between two glass plates for 16 hours, washed with acetone and dried. This procedure was repeated five times. A final treatment of the asbestos with a solution containing a 1 to 1 molar ratio of maleic anhydride to vinyl unsaturation was given to each membrane and they were then evaluated in a continuous alkali chlorine cell. The grams of polymer per square inch of asbestos was 0.46, and the membrane was tested for a period of 56 days. The results of that test are set forth below in Table II.

Table II

| | |
|---|---|
| Test period, days | 56 |
| Average NaOH efficiency at 140 grams per liter in percent | 79 |
| Average NaCl in cell caustic, percent by weight | 0.29 |
| Average cell voltage | 4.31 |

As can be readily seen from the above table, a caustic efficiency of 79 percent was obtained with the average sodium chloride content of the caustic soda on an anhydrous basis being 0.29 percent by weight.

EXAMPLE III

A solution of maleic anhydride and dioxane was added to a sheet of asbestos paper 11 inches by 14 inches by 0.045 inch of North American Type 41 Crocidolite Asbestos Paper. The saturated membrane was heated in an oven at 55° C. until the solvent had evaporated and the weight of the added maleic anhydride was 34.1 grams. A mixture of 189.6 grams of inhibitor free 53.5 percent divinyl benzene, 31.1 grams of inhibitor free styrene and 29.8 grams of dichlorobenzoyl peroxide was then added to the membrane. The membrane was heated between glass sheets at 55° C. for 16 hours. This membrane was then dried and placed in a continuous alkali chlorine cell for evaluation. The results of this test are shown below in Table III.

Table III

| | |
|---|---|
| Test period, days | 67 |
| Average NaOH efficiency at 140 grams per liter in percent | 89±2.3 |
| Average NaCl in cell caustic, percent by weight | 0.07 |
| Average cell voltage | 4.4 |

As can be readily seen from a comparison of the results of this example and the results of Example II, a considerably higher average caustic efficiency was obtained with this membrane where the solvent was evaporated from the maleic anhydride prior to the addition of the divinyl benzene-styrene solution. In addition, the average NaCl content on an anhydrous basis in the caustic soda produced was 0.07 percent by weight as compared with 0.29 percent in Example II where the solvent was not evaporated prior to the addition of the vinyl unsaturated compounds. It is to be noted that the grams of polymer per square inch in this example and that of Example II were essentially identical and the cell voltages were maintained at a point essentially identical. The results of the runs clearly emphasize the advantages that can be obtained by evaporating the solvent from the maleic anhydride prior to the addition of the other compounds forming the membrane.

The term "acid group" as used in the claims hereinafter appended means acidic groups including carboxylic, sulfonic and like groups, as well as the anhydride or salts thereof, notably the sodium, potassum or like alkali metal salts thereof.

While the invention has been described with reference to specific examples, it is to be understood that is is not to be limited thereby except insofar as appears in the accompanying claims.

I claim:

1. A method of preparing a diaphragm for use in an electrolytic chlorine cell comprising, dissolving maleic anhydride in an organic solvent, contacting an asbestos sheet with said solvent containing maleic anhydride to thereby impregnate the asbestos with the solvent containing maleic anhydride, removing the asbestos sheet from contact with said solution and evaporating the solvent therefrom, contacting the substantially solvent free asbestos sheet with a mixture consisting essentially of divinyl benzene and styrene, polymerizing the divinyl benzene, styrene and maleic anhydride in the substantial absence of the solvent, said maleic anhydride being employed in quantities of between 0.5 to 3 moles of maleic anhydride for each mole of vinyl unsaturation present in the divinyl benzene-styrene mixture wherein the polymer loading on the asbestos sheet is between 50 to 200 percent by weight basis the weight of the dry asbestos sheet.

2. The method of claim 1 wherein the polymer loading on the asbestos sheet is between 82 to 122 percent by weight basis the weight of the dry asbestos sheet.

3. A method of preparing a diaphragm for use in an electrolytic chlorine cell comprising, dissolving maleic anhydride in an organic solvent, contacting an asbestos sheet with said solvent containing maleic anhydride to thereby impregnate the asbestos with the solvent containing maleic anhydride, removing the asbestos sheet from contact with said solution and evaporating the solvent therefrom, contacting the substantially solvent free asbestos sheet with a mixture consisting essentially of divinyl benzene and styrene, polymerizing the divinyl benzene, styrene and maleic anhydride in the substantial absence of the solvent, said maleic anhydride being employed in quantities of between 0.5 to 3 moles of maleic anhydride for each mole of vinyl unsaturation present in the divinyl benzene-styrene mixture to thereby provide a diaphragm capable of producing an alkali metal hydroxide containing less than 0.1 percent alkali metal chloride when used in the electrolytic production of chlorine and alkali metal hydroxide by the electrolysis of alkali metal chloride solution.

References Cited by the Examiner

UNITED STATES PATENTS

| | | | |
|---|---|---|---|
| 2,730,768 | 1/1956 | Clarke | 204—296 X |
| 2,860,100 | 11/1958 | Krzyszkowski | 204—295 X |
| 2,978,393 | 4/1961 | Hoch et al. | 204—296 X |
| 2,978,401 | 4/1961 | Hoch et al. | 204—296 |
| 2,978,402 | 4/1961 | Hoch et al. | 204—296 X |

WILLIAM D. MARTIN, *Primary Examiner.*

R. HUSACK, *Assistant Examiner.*